July 2, 1957 K. G. ZIEMELIS 2,797,563
SHEAR-TYPE DRIVE
Filed July 18, 1955
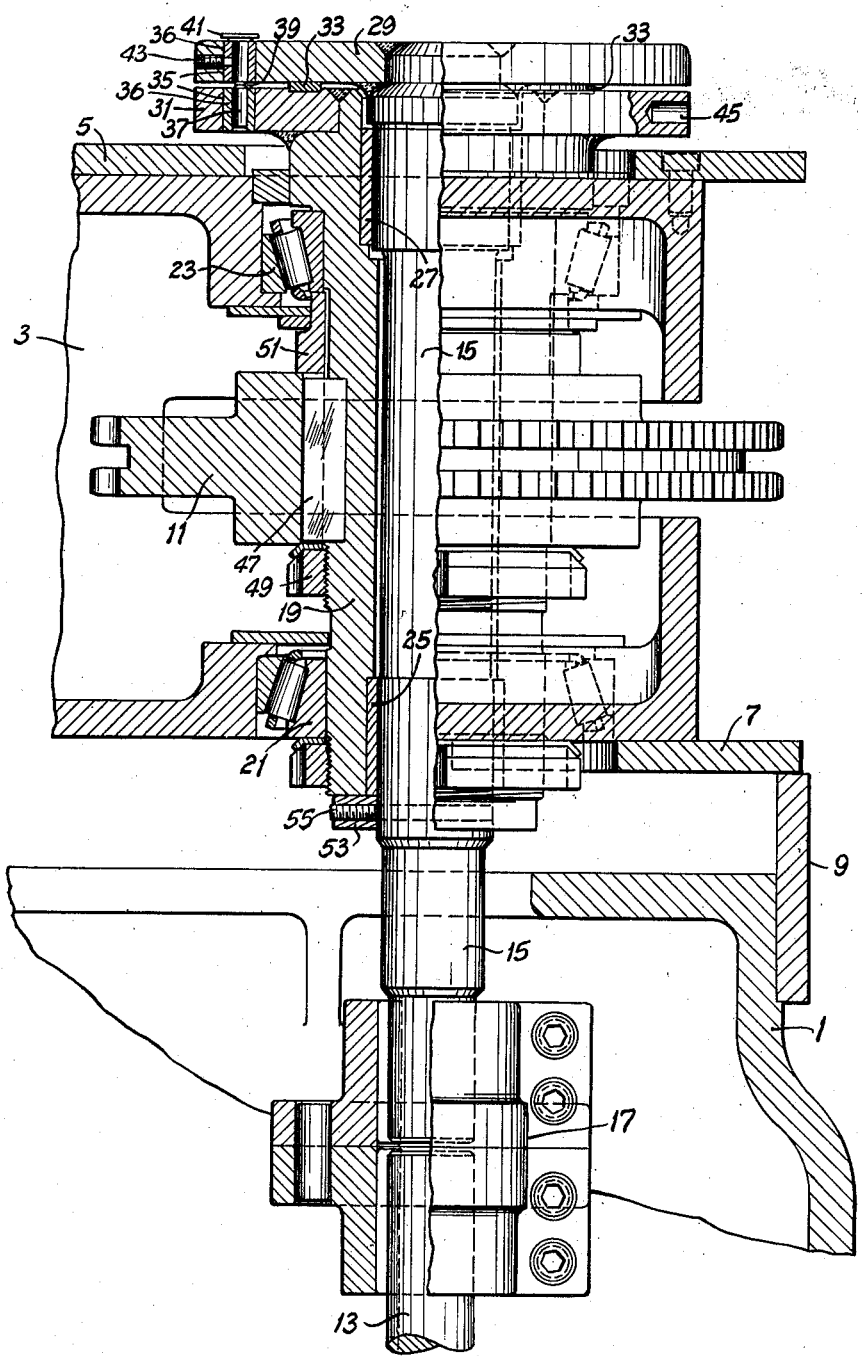

United States Patent Office 2,797,563
Patented July 2, 1957

2,797,563
SHEAR-TYPE DRIVE

Karlis G. Ziemelis, University City, Mo., assignor to Universal Match Corporation, Ferguson, Mo., a corporation of Delaware Application July 18, 1955, Serial No. 522,604

1 Claim. (Cl. 64—28)

This invention relates to shear-type drives, and more particularly to a vertical type of such a drive for intermittently movable indexing apparatus.

Among the several objects of the invention may be noted the provision of a shear-type drive for intermittently movable indexing apparatus which (1) assures a rigid mounting for the driving sprocket of such apparatus, (2) places the shear pin in an accessible position for replacement, and (3) allows relative motion between the driving and driven elements upon shearing action, without scuffing or other damage to the parts which are released for relative movement by such shearing action. Other objects and features will be in part apparent and in part pointed out hereinafter.

The invention accordingly comprises the construction hereinafter described, the scope of the invention being indicated in the following claims.

In the accompanying drawing, in which one of various possible embodiments of the invention is illustrated, the single figure is a vertical section showing driving and driven elements of intermittently movable indexing apparatus with the invention applied thereto.

Referring to the drawing, numeral 1 shows the bed of an indexing machine, the superstructure of which comprises a frame 3 to which are attached plates 5 and 7. An apron 9 is located below the plate 7. At 11 is shown a horizontally rotary sprocket (driven member) located upon a vertical axis. The sprocket drives a chain which supports carriers for workpieces which are to be intermittently moved in connection with operations to be performed upon them. The chain, carriers and workpieces are not illustrated, since they do not, per se, constitute the invention.

In view of the above, it will be seen that the sprocket 11 is required to be intermittently driven. This is accomplished by a suitable intermittent drive within the bed 1. The intermittently operating shaft of the drive is shown at 13. A central drive shaft 15 for the sprocket 11 is coupled to the intermittently operating shaft 13 by means of a coupling 17. This shaft, instead of as usual being coupled by means of a shear member to the driving sprocket 11, its made to pass through the center of a hollow quill 19, the latter being supported accurately and rigidly (except for rotation) in antifriction bearings 21 and 23, the latter being supported in the frame 3. Lower and upper bearing sleeves 25 and 27, respectively, are interposed between the shaft 15 and the quill 19.

Attached to the upper end of the shaft 19 is a driving disc 29, which is located above a driving disc 31, the latter being attached to the upper end of the quill 19. A bearing ring 33 is interposed between the discs 29 and 31. Bearing members 25, 27 and 33 are composed, for example, of bronze.

At the same radii on the discs 29 and 31 are openings 35, which may be aligned for the reception of a shear pin 37, having a shearing section 39 located in a plane between the discs 29 and 31, and having a head 41. The openings 35 carry liners 36. When the shear pin is dropped into position with its head engaging the top of disc 29, the shear section 39 lies between the discs 29 and 31. The shear pin is held in place by means of a set screw 43. A collar 53, by means of a set screw 55, is attached to the shaft 15, just below the quill 19.

Intermittent drive is accomplished from the intermittently movable shaft 13 through the shaft 15, disc 29, shear pin 37, disc 31, quill 19 and to the sprocket 11. If the chain driven by the sprocket 11 becomes overloaded or jammed, the shear pin 37 will shear across its shear section 39, thus allowing the shaft 15 and its disc 29 to rotate on bearings 25, 27 and 33 with respect to the quill 19 and disc 31. Free relative motion is then provided by bearings 25, 27 and 33, without the usual scuffing between shear-released parts. After the overload has been removed, the holes 35 may be realigned and a new shear pin 37 dropped into position. One or more spanner wrench openings, such as shown at 45, are provided at the periphery of the disc 31 for turning the quill into a position for alignment of the holes 35.

An advantage of the invention lies in the fact that the shearing action takes place in effect between the shaft 15 and the sprocket 11, but no shear pin is used in connection with the sprocket itself. Thus the sprocket is rigidly and accurately attached to the quill 19, as by means of key 47, nut 49 and backing collar 51. Moreover, the shear pin is not in the inaccessible location that it would be if it were employed directly at the point where the shaft passes through the sprocket. In addition, the construction allows for an effective radial and axial bearing arrangement between shaft 15 and quill 19 during the time that a shear pin is broken. No wobbling, scuffing action occurs between any inadequately aligned parts, since the bearings 25, 27 are widely spaced on opposite sides of the sprocket 11 and the ring 33 maintains accurate alignment. Lastly, the shear pin is in an accessible position on the top of the machine where replacements may be easily and safely dropped into operative position.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

A shear-type drive for indexing apparatus requiring a chain-driving sprocket rotating in a horizontal plane between spaced horizontal upper and lower plate members; comprising said plate members and said horizontal sprocket located between said plate members, a vertical hollow quill extending through said plate members, bearings in the respective plate members and supporting the quill near its upper and lower ends on opposite sides of the sprocket, the quill being permanently locked to the sprocket between said bearings and plate members, a vertical drive shaft extending through the quill, upper and lower bearings between the drive shaft and the quill, said last-named bearings being also located on opposite sides of the sprocket, adjacent horizontal discs located in a freely accessible position above the upper plate member and respectively attached to the quill and drive shaft, a horizontally disposed bearing between said discs, a shear pin having a head stop at one end and a shear portion intermediate its ends, said discs having vertically disposed openings adapted to be aligned conveniently to accept the shear pin vertically with its head forming a stop on the upper side of the upper disc adapted to place said shear portion between the discs and to make the pin freely accessible for replacement after shearing.

References Cited in the file of this patent

UNITED STATES PATENTS

| | | |
|---|---|---|
| 1,923,132 | Witkin | Aug. 22, 1933 |
| 2,216,118 | Kuhns | Oct. 1, 1940 |
| 2,307,556 | Wileman | Jan. 5, 1942 |